(12) United States Patent
Palmer, Jr.

(10) Patent No.: US 11,421,070 B2
(45) Date of Patent: *Aug. 23, 2022

(54) SPANDEX FROM POLY(TETRAMETHYLENE-CO-ETHYLENEETHER)GLYCOLS BLENDED WITH POLYMERIC GLYCOLS

(71) Applicant: The LYCRA Company LLC, Wilmington, DE (US)

(72) Inventor: Charles Francis Palmer, Jr., Greer, SC (US)

(73) Assignee: THE LYCRA COMPANY LLC, Wilmington, DE (US)

( * ) Notice: Subject to any disclaimer, the term of this patent is extended or adjusted under 35 U.S.C. 154(b) by 358 days.

This patent is subject to a terminal disclaimer.

(21) Appl. No.: 13/799,004

(22) Filed: Mar. 13, 2013

(65) Prior Publication Data

US 2013/0260128 A1 Oct. 3, 2013
US 2018/0118874 A9 May 3, 2018

Related U.S. Application Data

(63) Continuation of application No. 11/431,191, filed on May 8, 2006, now Pat. No. 8,420,765.

(60) Provisional application No. 60/738,732, filed on Nov. 22, 2005, provisional application No. 60/738,684, filed on Nov. 22, 2005, provisional application No. 60/594,811, filed on May 9, 2005.

(51) Int. Cl.

| | |
|---|---|
| *C08G 18/83* | (2006.01) |
| *D01F 6/78* | (2006.01) |
| *D01F 6/70* | (2006.01) |
| *C08G 18/12* | (2006.01) |
| *C08L 71/02* | (2006.01) |
| *C08G 18/10* | (2006.01) |
| *D01D 5/04* | (2006.01) |
| *C08G 18/48* | (2006.01) |
| *C08G 18/28* | (2006.01) |
| *C08G 18/72* | (2006.01) |
| *D02G 3/02* | (2006.01) |

(52) U.S. Cl.
CPC ........... *C08G 18/833* (2013.01); *C08G 18/10* (2013.01); *C08G 18/12* (2013.01); *C08G 18/2865* (2013.01); *C08G 18/48* (2013.01); *C08G 18/4808* (2013.01); *C08G 18/4854* (2013.01); *C08G 18/72* (2013.01); *C08L 71/02* (2013.01); *D01D 5/04* (2013.01); *D01F 6/70* (2013.01); *D01F 6/78* (2013.01); *D02G 3/02* (2013.01); *Y10T 428/249921* (2015.04)

(58) Field of Classification Search
CPC .... C08G 18/10; C08G 18/12; C08G 18/3228; C08G 18/4018; C08G 18/4808; C08G 18/4837; C08G 18/4854; C08G 18/4858; C08G 18/6685; C08G 18/833; C08G 18/2865; C08G 18/48; C08G 18/72; D02G 3/02; D01F 6/78; D01F 6/70; C08L 71/02; D01D 5/04; Y10T 428/249921

See application file for complete search history.

(56) References Cited

U.S. PATENT DOCUMENTS

| | | | | |
|---|---|---|---|---|
| 3,425,999 | A * | 2/1969 | Axelrood | C08G 18/10 521/163 |
| 6,020,451 | A * | 2/2000 | Fishback | C08G 18/12 525/409 |
| 6,639,041 | B2 * | 10/2003 | Nishikawa | C08G 18/10 528/61 |
| 8,420,765 | B2 * | 4/2013 | Palmer, Jr. | C08G 18/10 528/61 |
| 8,765,901 | B2 * | 7/2014 | Palmer, Jr. | C08G 18/10 528/61 |
| 2003/0166821 | A1 * | 9/2003 | Pruckmayr | C08G 18/4854 528/44 |
| 2004/0225101 | A1 * | 11/2004 | Selling | C08G 18/10 528/61 |
| 2006/0276610 | A1 * | 12/2006 | Jenny | C08G 18/10 528/44 |

* cited by examiner

*Primary Examiner* — Rabon A Sergent
(74) *Attorney, Agent, or Firm* — Kathleen A. Tyrrell

(57) ABSTRACT

A polyurethaneurea composition comprises a reaction product of at least one diisocyanate compound, a polymeric glycol, a poly(tetramethylene-co-ethyleneether) glycol comprising constituent units derived by copolymerizing tetrahydrofuran and ethylene oxide (EO) wherein the portion of the constituent units derived from ethylene oxide is present in the poly(tetramethylene-co-ethyleneether) glycol from greater than about 37 to about 70 mole percent, at least one diamine chain extender, and at least one chain terminator. The invention further relates to the use of blends of polymeric glycols and poly(tetramethylene-co-ethyleneether) glycols as the soft segment base in spandex compositions. The invention also relates to new polyurethane compositions comprising polymeric glycols and poly(tetramethylene-co-ethyleneether) glycols, and their use in spandex.

3 Claims, No Drawings

SPANDEX FROM POLY(TETRAMETHYLENE-CO-ETHYLENEETHER)GLYCOLS BLENDED WITH POLYMERIC GLYCOLS

BACKGROUND OF THE INVENTION

1. Field of the Invention

This invention relates to new polyurethaneurea compositions comprising polymeric glycols and poly(tetramethylene-co-ethyleneether) glycols comprising constituent units derived by copolymerizing tetrahydrofuran and ethylene oxide, wherein the portion of the units derived from ethylene oxide is present in the poly(tetramethylene-co-ethyleneether) glycol from greater than about 37 to about 70 mole percent. The invention further relates to the use of these blends of polymeric glycols and poly(tetramethylene-co-ethyleneether) glycols as the soft segment base material in spandex compositions. The invention also relates to new polyurethane compositions comprising blends of polymeric glycols and poly(tetramethylene-co-ethyleneether) glycols, and their use in spandex.

2. Description of the Related Art

Poly(tetramethylene ether) glycols, also known as polytetrahydrofuran or homopolymers of tetrahydrofuran (THF, oxolane) are well known for their use in soft segments in polyurethaneureas. Poly(tetramethylene ether) glycols impart superior dynamic properties to polyurethaneurea elastomers and fibers. They possess very low glass transition temperatures, but have crystalline melt temperatures above room temperature. Thus, they are waxy solids at ambient temperatures and need to be kept at elevated temperatures to prevent solidification.

Copolymerization with a cyclic ether has been used to reduce the crystallinity of the polytetramethylene ether chains. This lowers the polymer melt temperature of the copolyether glycol and at the same time improves certain dynamic properties of the polyurethaneurea that contains such a copolymer as a soft segment. Among the comonomers used for this purpose is ethylene oxide, which can lower the copolymer melt temperature to below ambient, depending on the comonomer content. Use of poly(tetramethylene-co-ethyleneether) glycols may also improve certain dynamic properties of polyurethaneureas, such as elongation at break and low temperature performance, which is desirable for some end uses.

Poly(tetramethylene-co-ethyleneether) glycols are known in the art. Their preparation is described in U.S. Pat. Nos. 4,139,567 and 4,153,786. Such copolymers can be prepared by any of the known methods of cyclic ether polymerization, such as those described in "Polytetrahydrofuran" by P. Dreyfuss (Gordon & Breach, N.Y. 1982), for example. Such polymerization methods include catalysis by strong proton or Lewis acids, heteropoly acids, and perfluorosulfonic acids or acid resins. In some instances it may be advantageous to use a polymerization promoter, such as a carboxylic acid anhydride, as described in U.S. Pat. No. 4,163,115. In these cases, the primary polymer products are diesters, which then need to be hydrolyzed in a subsequent step to obtain the desired polymeric glycols.

Poly(tetramethylene-co-ethyleneether) glycols offer advantages over poly(tetramethylene ether) glycols in teens of certain specific physical properties. At ethyleneether contents above 20 mole percent, the poly(tetramethylene-co-ethyleneether) glycols are moderately viscous liquids at room temperature and have a lower viscosity than poly(tetramethylene ether) glycols of the same molecular weight at temperatures above the melting point of poly(tetramethylene ether) glycols. Certain physical properties of the polyurethanes or polyurethaneureas prepared from poly(tetramethylene-co-ethyleneether) glycols surpass the properties of those polyurethanes or polyurethaneureas prepared from poly(tetramethylene ether) glycols.

Spandex based on poly(tetramethylene-co-ethyleneether) glycols is also known in the art. However, most of these are based on poly(tetramethylene-co-ethyleneether) containing co-extenders or extenders other than ethylene diamine. For example, U.S. Pat. No. 4,224,432 to Pechhold et al. discloses the use of poly(tetramethylene-co-ethyleneether) glycols with low cyclic ether content to prepare spandex and other polyurethaneureas. Pechhold teaches that ethyleneether levels above 30 percent are preferred. Pechhold does not teach the use of coextenders, though it discloses that mixtures of amines may be used.

U.S. Pat. No. 4,658,065 to Aoshima et al. discloses the preparation of several THF copolyethers via the reaction of THF and polyhydric alcohols using heteropolyacid catalysts. Aoshima also discloses that copolymerizable cyclic ethers, such as ethylene oxide, may be included with the THF in the polymerization process. Aoshima discloses that the copolyether glycols may be used to prepare spandex, but contains no examples of spandex from poly(tetramethylene-co-ethyleneether) glycols.

U.S. Pat. No. 3,425,999 to Axelrood et al. discloses the preparation of polyether urethaneureas from poly(tetramethylene-co-ethyleneether) glycols for use in oil resistance and good low temperature performance. The poly(tetramethylene-co-ethyleneether) glycols have ethyleneether content ranging from 20 to 60 percent by weight (equivalent to 29 to 71 mole percent). Axelrood does not disclose the use of these urethaneureas in spandex.

U.S. Pat. No. 6,639,041 to Nishikawa et al. discloses fibers having good elasticity at low temperature that contain polyurethaneureas prepared from polyols containing copolyethers of THF, ethylene oxide, and/or propylene oxide, diisocyanates, and diamines and polymers solvated in organic solvents. Nishikawa teaches that these compositions have improved low temperature performance over standard homopolymer spandexes. Nishikawa also teaches that "above about 37 mole % ethyleneether content in the copolyether glycol, unload power at low elongations is unacceptably low, elongation-at-break declines, and set rises, though very slightly." The examples in Nishikawa show that as the mole percent of ethylene ether moiety in the copolyether increases from 22 to 31 to 37 mole percent, the elongation at break rises, but upon increasing to 50 mole percent, the elongation at break then drops.

Due to the lower raw material cost of ethylene oxide and a higher yielding process, the cost of manufacture of poly(tetramethylene-co-ethyleneether) glycol decreases significantly as the ethyleneether content rises. For those spandex composition based on lower ethyleneether content (16 to 35 mole percent ethyleneether) poly(tetramethylene-co-ethyleneether) glycols, this invention provides for lower raw material costs because the cost of a blend of a high ethyleneether content poly(tetramethylene-co-ethyleneether) with poly(tetramethylene ether) glycols is less than the cost of a lower ethyleneether content poly(tetramethylene-co-ethyleneether) glycol.

In addition, it is apparent that high ethyleneether content poly(tetramethylene-co-ethyleneether) glycols are of value for certain spandex end uses while lower ethyleneether content poly(tetramethylene-co-ethyleneether) glycols are of more value for other spandex end uses. This invention allows for the production of only one or two high-ethyleneether copolyether glycols for all spandex end uses. For spandex end uses where a lower ethyleneether-content copolyether glycol is desired, the copolyether glycol could be produced by blending a high ethyleneether poly(tetramethylene-co-ethyleneether) glycol with poly(tetramethylene ether) glycols to reach the target ethyleneether content without sacrificing any of the desired physical properties of the spandex.

SUMMARY OF THE INVENTION

The present invention relates to spandex comprising a polyurethane or polyurethaneurea reaction product of: (a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from greater than about 37 to about 70 mole percent, (b) a polymeric glycol selected from the group consisting of a poly(tetramethylene ether) glycol, a poly(tetramethylene-co-2-methyltetramethyleneether) glycol, a poly(ethylene ether) glycol, a polypropylene ether) glycol, a polycarbonate glycol, a polyester glycol, or a combination thereof, (c) at least one diisocyanate, (d) at least one diamine or diol chain extender, and (e) at least one chain terminator, wherein the combined poly(tetramethylene-co-ethyleneether) glycol and polymeric glycol has a molecular weight between about 650 Dalton and about 4000 Dalton.

In one aspect of the present invention, the combined poly(tetramethylene-co-ethyleneether) glycol and the polymeric glycol of the above polyurethanes and polyurethaneureas has an overall percentage of units derived from ethylene oxide less than or equal to about 35 mole percent when the polymeric glycol is a poly(tetramethylene ether) glycol, a poly(tetramethylene-co-2-methyltetramethyleneether) glycol, a poly(propylene ether) glycol, a polycarbonate glycol, a polyester glycol, or a combination thereof and has an overall percentage of units derived from ethylene oxide between about 35 and about 70 mole percent when the polymeric glycol is a poly(ethylene ether) glycol.

The present invention also relates to a process for preparing the above spandex comprising: (a) contacting a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from greater than about 37 to about 70 mole percent and a polymeric glycol selected from the group consisting of a poly(tetramethylene ether) glycol, a poly(tetramethylene-co-2-methyltetramethyleneether) glycol, a poly(ethylene ether) glycol, a poly(propylene ether) glycol, a polycarbonate glycol, and a polyester glycol, or a combination of such members, with at least one diisocyanate to form a capped glycol, (b) optionally adding a solvent to the product of (a), (c) contacting the product of (b) with at least one diamine or diol chain extender and at least one chain terminator, and (d) spinning the product of (c) to form spandex.

DETAILED DESCRIPTION OF THE INVENTION

The invention relates to new spandex compositions prepared from blends of polymeric glycols and poly(tetramethylene-co-ethyleneether) glycols having high ethyleneether content, i.e., from greater than about 37 to about 70 mole percent, with at least one diisocyanate, for example 1-isocyanato-4-[(4-isocyanatophenyl)methyl]benzene, at least one chain extender, for example ethylene diamine, and at least one chain terminator, for example diethylamine. Optionally, other diisocyanates, extenders or combinations of extenders, and chain terminators may be used. For the purposes of this application, high-ethyleneether-containing poly(tetramethylene-co-ethyleneether) glycols are defined as those containing from greater than about 37 to about 70 mole percent repeat units derived from ethylene oxide. For example, the portion of the units derived from ethylene oxide may be present in the poly(tetramethylene-co-ethyleneether) glycol from about 48 to about 58 mole percent. Optionally, the portion of the units derived from ethylene oxide may be present in the poly(tetramethylene-co-ethyleneether) glycol from about 40 to about 70 mole percent. The percentage of units derived from ethylene oxide present in the glycol is equivalent to the percent of ethyleneether moieties present in the glycol.

The segmented polyurethanes or polyurethaneureas of this invention are made from a poly(tetramethylene-co-ethyleneether) glycol and, optionally, a polymeric glycol, at least one diisocyanate, and a difunctional chain extender. Poly(tetramethylene-co-ethyleneether) glycols are of value in forming the "soft segments" of the polyurethanes or polyurethaneureas used in making spandex. The poly(tetramethylene-co-ethyleneether) glycol or glycol mixture is first reacted with at least one diisocyanate to form an NCO-terminated prepolymer (a "capped glycol"), which is then dissolved in a suitable solvent, such as dimethylacetamide, dimethylformamide, or N-methylpyrrolidone, and then reacted with a difunctional chain extender. Polyurethanes are formed when the chain extenders are diols. Polyurethaneureas, a sub-class of polyurethanes, are formed when the chain extenders are diamines. In the preparation of a polyurethaneurea polymer which can be spun into spandex, the poly(tetramethylene-co-ethyleneether) glycol is extended by sequential reaction of the hydroxy end groups with diisocyanates and diamines. In each case, the poly(tetramethylene-co-ethyleneether) glycol must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

The poly(tetramethylene-co-ethyleneether) glycols used in making the polyurethanes or polyurethaneureas of the present invention can be made by the method disclosed in U.S. Pat. No. 4,139,567 to Pruckmayr using a solid perfluorosulfonic acid resin catalyst. Alternatively, any other acidic cyclic ether polymerization catalyst may be used to produce these poly(tetramethylene-co-ethyleneether) glycols, for example, heteropoly acids. The heteropoly acids and their so salts useful in the practice of this invention can be, for example, those catalysts used in the polymerization and copolymerization of cyclic ethers as described in U.S. Pat. No. 4,658,065 to Aoshima et al. These polymerization methods may include the use of additional promoters, such as acetic anhydride, or may include the use of chain terminator molecules to regulate molecular weight.

Poly(tetramethylene-co-ethylene ether) glycols used in making the polyurethanes or polyurethaneureas of the present invention can have an average molecular weight of about 650 Dalton to about 4000 Daltons. Higher poly(tetramethylene-co-ethyleneether) glycol molecular weight can be advantageous for selected physical properties, such as elongation.

The poly(tetramethylene-co-ethyleneether) glycols used in making the polyurethanes or polyurethaneureas of the present invention can include small amounts of units derived from chain terminator diol molecules, especially non-cyclizing diols. Non-cyclizing diols are defined as di-alcohols that will not readily cyclize to form a cyclic ether under the reaction conditions. These non-cyclizing diols can include ethylene glycol, 1,2-propylene glycol, 1,3-propylene glycol, 1,4-butynediol, and water.

Poly(tetramethylene-co-ethyleneether) glycols which optionally comprise at least one additional component, such as for example 3-methyltetrahydrofuran, the ether derived from 1,3-propanediol, or other diols incorporated in small amounts as molecular weight control agents, can also be used in making the polyurethanes and polyurethaneureas of the present invention and are included in the meaning of the term "poly(tetramethylene-co-ethyleneether) or poly(tetramethylene-co-ethyleneether) glycol." The at least one additional component may be a comonomer of the polymeric glycol or it may be another material that is blended with the poly(tetramethylene-co-ethyleneether) glycol. The at least one additional component may be present to the extent that it does not detract from the beneficial aspects of the invention.

Polymeric glycols that can be used in making the polyurethanes or polyurethaneureas of the invention can have an average molecular weight of about 650 Dalton to about 4000 Dalton. Useful polymeric glycols include poly(tetramethylene ether) glycols, poly(tetramethylene-co-2-methyltetramethyleneether) glycols, poly(ethylene ether) glycols, poly (propylene ether) glycols, polycarbonate glycols, and polyester glycols, or a combination of such members. The polymeric glycol can optionally comprise at least one additional component, such as another comonomer of the polymeric glycol or it may be another material that is blended with the polymeric glycol, and such options are included in the meaning of the term "polymeric glycol." The at least one additional component may be present as long as it does not detract from the beneficial aspects of the invention. When the polymeric glycol is a polyester glycol, the polyester glycol is selected from the group consisting of reaction products of (i) ethylene glycol, propylene glycol, butylene glycol, 2,2-dimethyl-1,3-propanediol, and mixtures thereof, and (ii) terephthalic acid, succinic acid, adipic acid, azelaic acid, sebacic acid, and dodecanedioic acid, and mixtures thereof.

When the poly(tetramethylene-co-ethyleneether) glycol is blended with a polymeric glycol which is not poly(ethylene ether) glycol, the combined poly(tetramethylene-co-ethyleneether) glycol and the polymeric glycol may have an overall percentage of units derived from ethylene oxide which is less than or equal to, for example, about 40 mole percent, or about 35 mole percent, or about 30 mole percent. When the poly(tetramethylene-co-ethyleneether) glycol is blended with poly(ethylene ether) glycol, the combined poly(tetramethylene-co-ethyleneether) glycol and the poly (ethylene ether) glycol may have an overall percentage of units derived from ethylene oxide from about 35 to about 70 mole percent, for example from about 37 to about 70 mole percent, or from about 40 to about 65 mole percent. Whether the polymeric glycol is poly(ethylene ether) glycol or another polymeric glycol, in the blend the poly(tetramethylene-co-ethyleneether) glycol and the polymeric glycol are each present in at least 10 mole percent of the sum of the moles of poly(tetramethylene-co-ethyleneether) glycol and the moles of polymeric glycol.

Diisocyanates that can be used include, but are not limited to, 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof. Particularly preferred diisocyanates are 1-isocyanato-4[(4-isocyanatophenyl)methyl] benzene, 1-isocyanato-2-[(4-cyanatophenyl)methyl]benzene, and mixtures thereof. A particularly preferred diisocyanate is 1-isocyanato-4-[(4-isocyanatophenyl)methyl]benzene.

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy) benzene, and 1,4-butanediol and mixtures thereof.

When a polyurethaneurea is desired, the chain extender is a diamine. Examples of such diamines that may be used include, but are not limited to, hydrazine, ethylene diamine, 1,2-propanediamine, 1,3-propanediamine, 1,2-butanediamine (1,2-diaminobutane), 1,3-butanediamine (1,3-diaminobutane), 1,4-butanediamine (1,4-diaminobutane), 1,3-diamino-2,2-dimethylbutane, 4,4'-methylene-bis-cyclohexylamine, 1-amino-3,3,5-trimethyl-5-aminomethylcyclohexane, 1,6-hexanediamine, 2,2-dimethyl-1,3-diaminopropane, 2,4-diamino-1-methylcyclohexane, N-methylamino-bis(3-propylamine), 2-methyl-1,5-pentanediamine, 1,5-diaminopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3,5,5-trimethylcyclohexane, 1,3-pentanediamine (1,3-diaminopentane), m-xylylene diamine, and mixtures thereof.

Optionally, a chain terminator, for example diethylamine, cyclohexylamine, n-hexylamine, or a monofunctional alcohol chain terminator such as butanol, can be used to control the molecular weight of the polymer. Additionally, a higher functional alcohol "chain brancher" such as pentaerythritol, or a trifunctional "chain brancher," such as diethylenetriamine, can be used to control solution viscosity.

The polyurethanes and polyurethaneureas of the present invention may be used in any application where polyurethanes or polyurethaneureas of this general type are employed, but are of special benefit in fabricating articles which require high elongation, low modulus, or good low temperature properties when in use. They are of particular benefit in fabricating spandex, elastomers, flexible and rigid foams, coatings (both solvent and water-based), dispersions, films, adhesives, and shaped articles.

As used herein and unless otherwise indicated, the term "spandex" means a manufactured fiber in which the fiber-forming substance is a long chain synthetic polymer comprised of at least 85 percent by weight of a segmented polyurethane or polyurethaneureas. Spandex is also referred to as elastane.

The spandex of the present invention can be used to make knit and woven stretch fabrics, and garments or textile articles comprising such fabrics. Stretch fabric examples include circular, flat, and warp knits, and plain, twill, and satin wovens. The term "garment," as used herein, refers to an article of clothing such as a shirt, pants, skirt, jacket, coat, work shirt, work pants, uniform, outerwear, sportswear, swimsuit, bra, socks, and underwear, and also includes accessories such as belts, gloves, mittens, hats, hosiery, or footwear. The term "textile article," as used herein, refers to an article comprising fabric, such as a garment, and further includes such items as sheets, pillowcases, bedspreads, quilts, blankets, comforters, comforter covers, sleeping bags, shower curtains, curtains, drapes, tablecloths, napkins, wiping cloths, dish towels, and protective coverings for upholstery or furniture.

The spandex of the present invention can be used alone or in combination with various other fibers in wovens, weft (including flat and circular) knits, warp knits, and personal hygiene apparel such as diapers. The spandex can be bare, covered, or entangled with a companion fiber such as nylon, polyester, acetate, cotton, and the like.

Fabrics comprising the spandex of the present invention may also comprise at least one fiber selected from the group consisting of protein, cellulosic, and synthetic polymer fibers, or a combination of such members. As used herein, "protein fiber" means a fiber composed of protein, including such naturally occurring animal fibers as wool, silk, mohair, cashmere, alpaca, angora, vicuna, camel, and other hair and fur fibers. As used herein, "cellulosic fiber" means a fiber produced from tree or plant materials, including for example cotton, rayon, acetate, lyocell, linen, ramie, and other vegetable fibers. As used herein, "synthetic polymer fiber" means a manufactured fiber produced from a polymer built up from chemical elements or compounds, including for example polyester, polyamide, acrylic, spandex, polyolefin, and aramid.

An effective amount of a variety of additives can also be used in the spandex of the invention, provided they do not detract from the beneficial aspects of the invention. Examples include delustrants such as titanium dioxide and stabilizers such as hydrotalcite, a mixture of huntite and hydromagnesite, barium sulfate, hindered phenols, and zinc oxide, dyes and dye enhancers, antimicrobials, antitack agents, silicone oil, hindered amine light stabilizers, UV screeners, and the like.

The spandex of the present invention or the fabric comprising it may be dyed and printed by customary dyeing and printing procedures, such as from an aqueous dye liquor by the exhaust method at temperatures between 20° C. and 130° C., by padding the material comprising the spandex with dye liquors, or by spraying the material comprising the spandex with dye liquor.

Conventional methods may be followed when using an acid dye. For example, in an exhaust dyeing method, the fabric can be introduced into an aqueous dye bath having a pH of between 3 and 9 which is then heated steadily from a temperature of approximately 20° C. to a temperature in the range of 40 to 130° C. over the course of about 10 to 80 minutes. The dye bath and fabric are then held at temperature in the range of 40 to 130° C. for from 10-60 minutes before cooling. Unfixed dye is then rinsed from the fabric. Stretch and recovery properties of the spandex are best maintained by minimal exposure time at temperatures above 110° C. Conventional methods may also be followed when using a disperse dye.

The new spandex compositions, and the fabrics, garments, and textile articles made therefrom, when dyed with an acid dye or with a disperse dye, can have improved washfastness, for example after one or after four washes, when compared to poly(tetramethylene ether) glycol-based spandex. As used herein, the term "washfastness" means the resistance of a dyed fabric to loss of color during home or commercial laundering. Lack of washfastness can result in color loss, sometimes referred to as color bleed, by an article that is not washfast. This can result in a color change in an article which is laundered together with the article that is not washfast. Consumers generally desire fabrics and yarns to exhibit washfastness. Washfastness relates to fiber composition, fabric dyeing and finishing processes, and laundering conditions. Spandex having improved washfastness is desired for today's apparel.

To determine washfastness, pieces of dyed 100% spandex fabrics may be given a standard wash stain test, for example American Association of Textile Chemists and Colorists Test Method 61-1996, "Colorfastness to Laundering, Home and Commercial: Accelerated"; 2A version, which is intended to simulate five typical home or commercial launderings at low-to-moderate temperatures.

The washfastness properties of the spandex of the present invention may be supported and further enhanced by use of customary auxiliary chemical additives. Anionic syntans may be used to improve the wetfastness characteristics, and can also be used as retarding and blocking agents when a minimal partition of dye is required between the spandex and partner yarn. Anionic sulfonated oil is an auxiliary additive used to retard anionic dyes from spandex or partner fibers that have a stronger affinity for the dye where uniform level dyeing is required. Cationic fixing agents can be used alone or in conjunction with anionic fixing agents to support improved washfastness.

Spandex fiber can be formed from the polyurethane or polyurethaneurea polymer solution through fiber spinning processes such as dry spinning or melt spinning. In dry spinning, a polymer solution comprising a polymer and solvent is metered through spinneret orifices into a spin chamber to form a filament or filaments. Polyurethaneureas are typically dry-spun or wet-spun when spandex is desired. Polyurethanes are typically melt-spun when spandex is desired. Typically, the polyurethaneurea polymer is dry spun into filaments from the same solvent as was used for the polymerization reactions. Gas is passed through the chamber to evaporate the solvent to solidify the filament(s). Filaments are dry spun at a windup speed of at least 550 meters per minute. The spandex of the present invention is spun at a speed in excess of 800 meters/minute. As used herein, the term "spinning speed" refers to windup speed, which is determined by and is the same as the drive roll speed. Good spinability of spandex filaments is characterized by infrequent filament breaks in the spinning cell and in the wind up. The spandex can be spun as single filaments or can be coalesced by conventional techniques into multi-filament yarns. Each filament is of textile decitex (dtex), in the range of 6 to 25 dtex per filament.

It is well known to those skilled in the art that increasing the spinning speed of a spandex composition will reduce its elongation and raise its load power compared to the same spandex spun at a lower speed. Therefore, it is common practice to slow spinning speeds in order to increase the elongation and reduce the load power of a spandex in order to increase its draftability in circular knitting and other spandex processing operations. Lowering spinning speed, however, reduces manufacturing productivity.

The practice of the present invention is demonstrated by the Examples below which are not intended to limit the scope of the invention. Physical property data for each of the Examples and the Comparison Example are displayed in Table 1.

As used herein and unless otherwise indicated, the term "DMAc" means dimethylacetamide solvent, the term "% NCO" means weight percent of the isocyanate end groups in a capped glycol, the term "MPMD" means 2-methyl-1,5-pentanediamine, the term "EDA" means 1,2-ethylenediamine, and the term "PTMEG" means poly(tetramethylene ether) glycol.

As used herein, the term "capping ratio" is defined as the molar ratio of diisocyanate to glycol, with the basis defined as 1.0 mole of glycol. Therefore, the capping ratio is typically reported as a single number, the moles of diisocyanate per one mole of glycol. For the polyurethaneureas of the present invention, the preferred molar ratio of diisocyanate to poly(tetramethylene-co-ethylene ether) glycol is about 1.2 to about 2.3. For the polyurethanes of the present invention, the preferred molar ratio of diisocyanate to poly(tetramethylene-co-ethylene ether) glycol is about 2.3 to about 17, preferably about 2.9 to about 5.6.

Materials

THF and PTMEG (TERATHANE® 1800) are available from Invista S.à r.l., Wilmington, Del., USA. NAFION® perfluorinated sulfonic acid resin is available from E.I. DuPont de Nemours and Company, Wilmington, Del., USA.

Analytical Methods

Tenacity is the stress at break in the sixth stretching cycle, or in other words, the resistance of the fiber to breaking at ultimate elongation. Load power is the stress at specified elongations in the first stretching cycle, or in other words, the resistance of the fiber to being stretched to higher elongation. Unload power is the stress at specified elongations in the fifth retraction cycle, or in other words, the retractive force of the fiber at a given elongation after having been cycled to 300 percent elongation five times.

Percent isocyanate—Percent isocyanate (% NCO) of the capped glycols was determined according to the method of S. Siggia, "Quantitative Organic Analysis via Functional Group", 3rd Edition, Wiley & Sons, New York, pages 559-561 (1963) using a potentiometric titration. For the polyurethanes of the present invention Ethyleneether content—The level of ethyleneether content in the poly(tetramethylene-co-ethyleneether) glycols was determined from $^1$H NMR measurements. The sample of poly(tetramethylene-co-ethyleneether) glycol was dissolved in a suitable NMR solvent such as $CDCl_3$ and the $^1$H NMR spectrum obtained. The integral of the combined —$OCH_2$ peaks at 3.7-3.2 ppm was compared to the integral of the combined —C—$CH_2CH_2$—C— peaks from 1.8-1.35 ppm. The —$OCH_2$— peaks come from both EO-based linkages (—O—$CH_2CH_2$—O—) and from THF-based linkages (—O—$CH_2CH_2CH_2CH_2$—O—) while the —C—$CH_2CH_2$—C— linkages come from THF only. To find the molar fraction of ethyleneether linkages in the poly(tetramethylene-co-ethyleneether) glycols, the integral of the —C—$CH_2CH_2$—C— peaks was subtracted from the integral of the combined —$OCH_2$— peaks and then that result was divided by the integral of the —$OCH_2$— peaks.

Number average molecular weight—The number average molecular weight of the poly(tetramethylene-co-ethyleneether) glycol was determined by the hydroxyl number method.

Heat-set efficiency—To measure heat-set efficiency, the yarn samples were mounted on a 10-cm frame and stretched 1.5×. The frame (with sample) was placed horizontally in an oven preheated to 190° C. for 120 seconds. The samples were allowed to relax and the frame to cool to room temperature. The samples (still on the frame and relaxed) were then immersed in a boiling de-mineralized water for 30 minutes. The frame and samples were removed from the bath and allowed to dry. The length of the yarn samples was measured and heat set efficiency (HSE, as a percentage) was calculated according to the following formula:

% HSE=(heat set length−original length)/(stretched length−original length)×100

A spandex heat-set efficiency of at least about 85% at 175° C. is needed for use with fabrics containing spandex and cotton or wool. Similar heat-set efficiency can be achieved at 190° C. for use with hard fibers such as nylon.

Strength and Elastic Properties—The strength and elastic properties of the spandex were measured in accordance with the general method of ASTM D 2731-72. An Instron tensile tester was used to determine tensile properties. Three filaments, a 2-inch (5-cm) gauge length and zero-to-300% elongation cycles were used for each of the measurements "as-is" from the windup, that is, without scouring or other treatment, after 24 hours of aging at approximately 70° F. and 65% relative humidity (+/−2%) in a controlled environment. The samples were cycled five times at a constant elongation rate of 50 cm per minute and then held at 300% extension for 30 seconds after the fifth extension. Immediately after the fifth stretch, the stress at 300% elongation was recorded as "G1." After the fiber was held at 300% extension for 30 seconds, the resulting stress was recorded as "G2." The stress relaxation was determined using the following formula:

Stress Relaxation (%)=100×($G1$−$G2$)/$G1$

Stress relaxation is also referred to as stress decay (abbreviated as Dec % in Table V).

Load power, the stress on spandex during initial extension, was measured on the first cycle at 100%, 200%, or 300% extension and is reported in the Tables in grams per denier and designated "LP"; for example, LP200 indicates load power at 200% extension. Unload power, the stress at an extension of 100% or 200% on the fifth unload cycle, is also reported in grams per denier; it is designated as "UP". Percent elongation at break ("Elo") and tenacity ("ten") were measured on the sixth extension cycle using modified Instron grips to which a rubber tape was attached for reduced slippage.

Percent set—Unless otherwise indicated, percent set was also measured on samples that had been subjected to five 0-300% elongation/relaxation cycles. Percent set ("% SET") was calculated as:

% SET=100($Lf$−$Lo$)/$Lo$ wherein Lo and Lf are the filament (yarn) length, when held straight without tension, before and after the five elongation/relaxation cycles, respectively.

Circular knit (CK) draft—In knitting, the spandex stretches (drafts) when it is delivered from the supply package to the carrier plate and in turn to the knit stitch due to the difference between the stitch use rate and the feed rate from the spandex supply package. The ratio of the hard yarn supply rate (meters/min) to the spandex supply rate is normally 2.5 to 4 times (2.5× to 4×) greater, and is known as the machine draft, "MD." This corresponds to spandex elongation of 150% to 300%, or more. As used herein, the term "hard yarn" refers to relatively inelastic yarn, such as polyester, cotton, nylon, rayon, acetate, or wool.

The total draft of the spandex yarn is a product of the machine draft (MD) and the package draft (PD), which is the amount that the spandex yarn is already stretched on the supply package. For a given denier (or decitex), the spandex content in a fabric is inversely proportional to the total draft; the higher the total draft, the lower the spandex content. PR is a measured property called "Percent Package Relaxation" and is defined as 100*(length of yarn on the package−length of relaxed yarn)/(length of yarn on the package). PR typically measures 5 to 15 for the spandex used in circular knit, elastic, single jersey fabrics. Using the measured PR, package draft (PD) is defined as 1/(1−PR/100). Therefore, the total draft (TD) may also be calculated as MD/(1−PR/100). A yarn with 4× machine draft and 5% PR would have a total draft of 4.21×, while a yarn with machine draft of 4× and 15% PR would have a total draft of 4.71×.

For economic reasons, circular knitters will often try to use the minimum spandex content consistent with adequate fabric properties and uniformity. As explained above, increasing spandex draft is a way to reduce content. The main factor that limits draft is the percent elongation to break, so a yarn with high percent elongation to break is the most important factor. Other factors, such as tenacity at break, friction, yarn tackiness, denier uniformity, and defects in yarn can reduce the practical achievable draft. Knitters will provide a safety margin for these limiting factors by reducing draft from the ultimate draft (measured percent elongation at break). They typically determine this "sustainable draft" by increasing draft until knitting breaks reach an unacceptable level, such as 5 breaks per 1,000 revolutions of the knitting machine, then backing off until acceptable performance is regained.

Tension in knitting needles can also be a limiting factor for draft. The feed tension in the spandex yarn is directly related to the total draft of the spandex yarn. It is also a function of the inherent modulus (load power) of the spandex yarn. In order to maintain acceptably low tension in knitting at high draft, it is advantageous for the spandex to have a low modulus (load power).

The ideal yarn for high draftability would therefore have high percent elongation to break, low modulus (load power), and adequately high tenacity, low friction and tack, uniform denier, and a low level of defects.

Because of its stress-strain properties, spandex yarn drafts (draws) more as the tension applied to the spandex increases; conversely, the more that the spandex is drafted, the higher the tension in the yarn. A typical spandex yarn path in a circular knitting machine is as follows. The spandex yarn is metered from the supply package, over or through a broken end detector, over one or more change-of-direction rolls, and then to the carrier plate, which guides the spandex to the knitting needles and into the stitch. There is a build-up of tension in the spandex yarn as it passes from the supply package and over each device or roller, due to frictional forces imparted by each device or roller that touches the spandex. The total draft of the spandex at the stitch is therefore related to the sum of the tensions throughout the spandex path.

Residual DMAc in Spandex—The percent DMAc remaining in the spandex samples was determined by using a Duratech DMAc analyzer. A known amount of perclene was used to extract the DMAc out of a known weight of spandex. The amount of DMAc in the perclene was then quantified by measuring the UV absorption of the DMAc and comparing that value to a standardization curve.

Hot-wet creep—Hot-wet creep (HWC) is determined by measuring an original length, $L_0$, of a yarn, stretching it to one-and-a-half times its original length (1.54), immersing it in its stretched condition for 30 minutes in a water bath maintained at temperature in the range of 97 to 100° C., removing it from the bath, releasing the tension and allowing the sample to relax at room temperature for a minimum of 60 minutes before measuring the final length, $L_f$. The percent hot-wet creep is calculated from the following formula:

% HWC=100×[($L_f$−$L_0$)/$L_0$]

Fibers with low % HWC provide superior performance in hot-wet finishing operations, such as dyeing.

EXAMPLES

Samples of random poly(tetramethylene-co-ethyleneether) glycols with 27, 38 and 49 mole percent ethyleneether content and 2045, 2535, and 2049 Daltons molecular weights, respectively, were prepared by contacting a solution of THF, EO, and water with Nafion® resin catalyst followed by distilling off the unreacted THF and ethylene oxide, filtering to remove any catalyst fines present, and then distilling off the cyclic ether by-products.

For each example, the blend of poly(tetramethylene-co-ethyleneether) glycol and PTMEG was contacted with 1-isocyanato-4-[(4-isocyanatophenyl) methyl]benzene to form a capped (isocyanate-terminated) glycol with approximately 2.4% NCO. The capped glycol was then dissolved in DMAc, chain-extended with ethylene diamine, and chain-terminated with diethylamine to form a polyurethaneurea spinning solution. The amount of DMAc used was such that the final spinning solution had 30-35 wt % polyurethaneurea in it, based on total solution weight. An antioxidant, pigment, and silicone spinning aid were added to all of the compositions. The spinning solution was dry-spun into a column provided with dry nitrogen; the filaments coalesced, passed around a godet roll and wound at 840-880 m/min. The filaments spin well as evidenced by few breaks in the spin cell or windup. All Example yarns were 40 denier (44 dtex) and contained four filaments. All spandex fiber samples were spun under conditions that dried all of the yarns to about the same residual solvent level.

Example 1

A random poly(tetramethylene-co-ethyleneether) glycol with 38 mole percent ethyleneether units and 2535 Daltons number average molecular weight (693 g) was mixed with poly(tetramethylene ether) glycol having 1800 Daltons number average molecular weight (307 g) and dried via azeotropic distillation with toluene. The polyether glycol mixture had an average of 27 mole percent of units derived from ethylene oxide and a number average molecular weight of 2253 Daltons. To the mixture was added 100 ppm of a mineral acid and 1-isocyanato-4-[(4-isocyanato-phenyl) methyl]benzene and the mixture was stirred at 90° C. for 120 minutes to give a 2.49% NCO (1.80 capping ratio) prepolymer. This prepolymer was diluted with DMAc solvent and chain extended with a mixture of ethylenediamine and diethylamine to give a spandex polymer solution containing 31.6 weight percent polyurethaneurea. The spinning solution was dry-spun into a column provided with 440° C. dry nitrogen, coalesced, passed around a godet roll, and wound up at 869 m/min. The filaments demonstrated good spinability. Fiber properties are presented in Table 1.

Example 2

A random poly(tetramethylene-co-ethyleneether) glycol with 49 mole percent ethyleneether units and 2049 Daltons number average molecular weight (498 g) was mixed with poly(tetramethylene ether) glycol having 1800 Daltons number average molecular weight (502 g) and dried via azeotropic distillation with toluene. The polyether glycol mixture had an average of 27 mole percent of units derived from ethylene oxide and a number average molecular weight of 1936 Daltons. To the mixture was added 100 ppm of a mineral acid and 1-isocyanato-4-[(4-isocyanato-phenyl) methyl]benzene and the mixture was stirred at 90° C. for 120 minutes to give a 2.38% NCO (1.67 capping ratio) prepolymer. This prepolymer was then diluted with DMAc solvent and chain extended with a mixture of ethylenediamine and diethylamine to give a spandex polymer solution containing 30.8 weight percent polyurethaneurea. The spinning solution was dry-spun into a column provided with 440° C. dry nitrogen, coalesced, passed around a godet roll, and wound up at 869 m/min. The filaments demonstrated good spinability. Fiber properties are presented in Table 1.

Comparison Example

A random poly(tetramethylene-co-ethyleneether) glycol with 27 mole percent ethyleneether units and 2045 number average molecular weight was dried via azeotropic distillation with toluene. To the dried glycol was added 100 ppm of a homogenous mineral acid and 1-isocyanato-4-[(4-isocyanato-phenyl)methyl]benzene and the mixture stirred at 90° C. for 120 minutes to give a 2.42% NCO (1.71 capping ratio) prepolymer. This prepolymer was then diluted with DMAc solvent and chain extended with a mixture of ethylenediamine and diethylamine to give a spandex polymer solution containing 31.1 weight percent polyurethaneurea. The spinning solution was dry-spun into a column provided with 440° C. dry nitrogen, coalesced, passed around a godet roll, and wound up at 869 m/min. The filaments demonstrated good spinability. Fiber properties are presented in Table 1.

TABLE 1

|  | Example 1 | Example 2 | Comparison Example |
|---|---|---|---|
| Windup speed (m/min) | 869 | 869 | 869 |
| LP100 (g/den) | 0.0693 | 0.0882 | 0.0938 |
| LP200 (g/den) | 0.1176 | 0.1430 | 0.1544 |
| LP300 (g/den) | 0.1738 | 0.2119 | 0.2264 |
| 5th cycle LP100 (g/den) | 0.0223 | 0.0214 | 0.0213 |
| 5th cycle LP200 (g/den) | 0.0454 | 0.0458 | 0.0457 |
| 5th cycle LP300 (g/den) | 0.1647 | 0.1748 | 0.1762 |
| 5th cycle UP100 (g/den) | 0.0179 | 0.0171 | 0.0167 |
| 5th cycle UP200 (g/den) | 0.0352 | 0.0336 | 0.0343 |
| Stress Decay (%) | 20.40 | 21.66 | 22.05 |
| Tenacity (g/den) | 0.7038 | 0.7817 | 0.6055 |
| Elongation (%) | 628 | 581 | 569 |
| Set (%) | 25.42 | 26.09 | 27.70 |

As may be seen by examination of the data in Table 1, the Examples of this invention are improved over the Comparison Example though all three have the same ethyleneether content. One Example has a higher glycol molecular weight while one has a lower glycol molecular weight than the Comparison Example. The first cycle load power, which is most important to spandex fabric mill customers, is desirably lower at all elongations than the Comparison spandex. The unload power (refractive force) is desirably higher at 100% elongation than the Comparison spandex, and is similar at 200% elongation. Both the stress decay and the percent set of the invention are desirably lower than the Comparison spandex, while the tenacity and the elongation of the invention spandex are both desirably greater than the Comparison spandex.

The invention has been described in detail with reference to preferred embodiments thereof. However, it will be appreciated that those skilled in the art, upon consideration of this disclosure, may make modifications and improvements within the spirit and scope of the invention.

What is claimed is:

1. A spandex comprising polyurethaneurea comprising a reaction product of:
    (a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from greater than 37 to 49 mole percent and wherein the poly(tetramethylene-co-ethyleneether) glycol has a molecular weight ranging from 2049 to 2535 Daltons;
    (b) a poly(tetramethylene ether) glycol having a molecular weight of 1800 Daltons;
    (c) at least one diisocyanate selected from the group consisting of 1-isocyanato-4-[(4-isocyanato-phenyl) methyl]benzene, 1-isocyanato-2-[(4-isocyanato-phenyl)methyl]benzene, and mixtures thereof; and
    (d) a mixture of ethylenediamine and diethylamine;
wherein the poly(tetramethylene-co-ethyleneether) glycol and the poly(tetramethylene ether) glycol are blended into a mixture having an average of 27 mole percent of units derived from ethylene oxide and a molecular weight of 1936 to 2253, and wherein said spandex exhibits lower first cycle load power, stress decay and percent set and greater tenacity and higher unload power at 100% elongation as compared to poly(tetramethylene-co-ethyleneether) glycol-based spandex with the same ethyleneether content prepared from poly(tetramethylene-co-ethylene ether) glycol having a molecular weight of about 2045 Dalton without a poly (tetramethylene ether) glycol.

2. A fabric comprising the spandex of claim 1.

3. A garment or textile article comprising the fabric of claim 2.

\* \* \* \* \*